Sept. 16, 1941.   U. L. SMITH   2,255,946
INSTRUMENT CASING
Filed Dec. 19, 1939   2 Sheets-Sheet 1
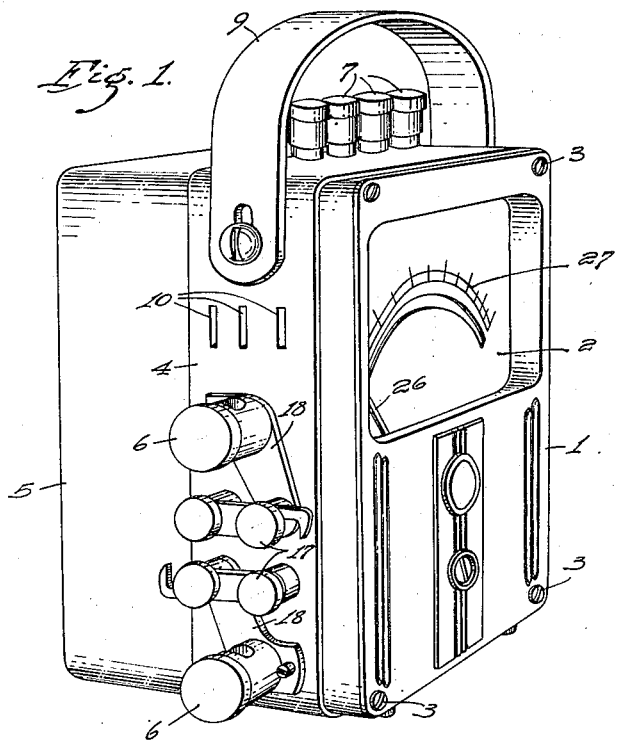
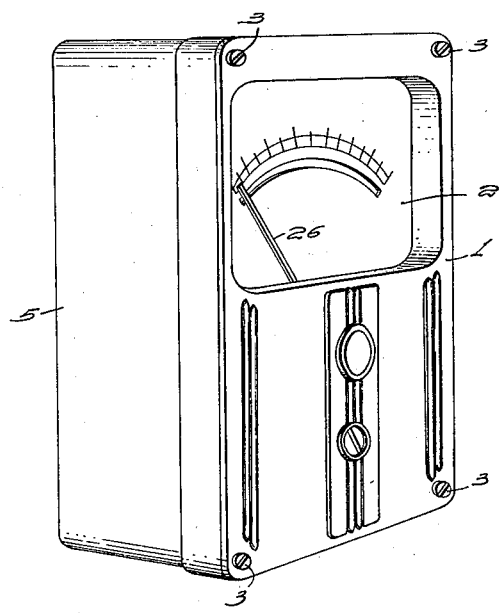

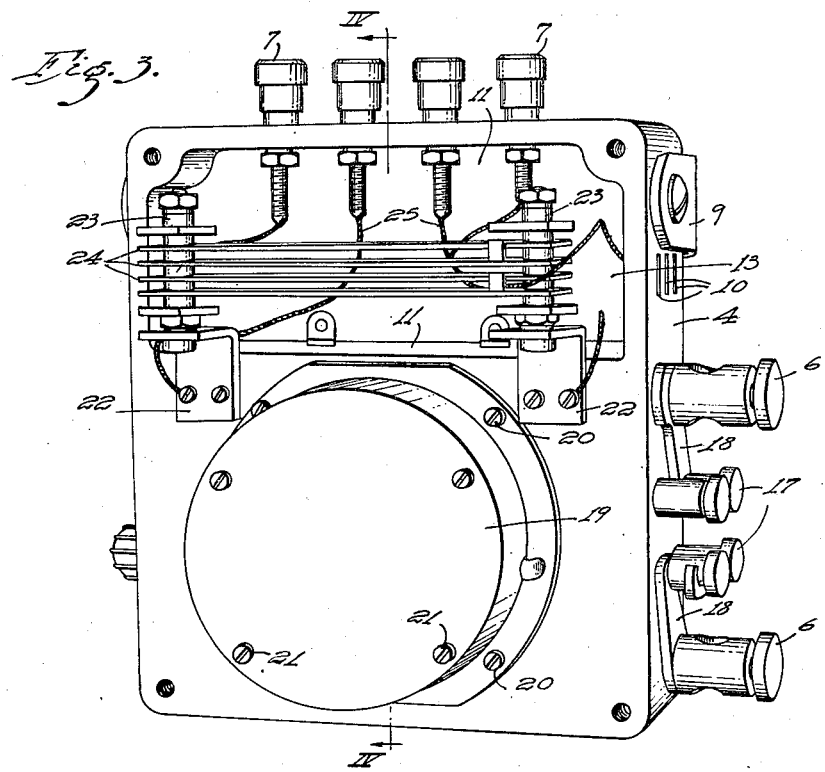
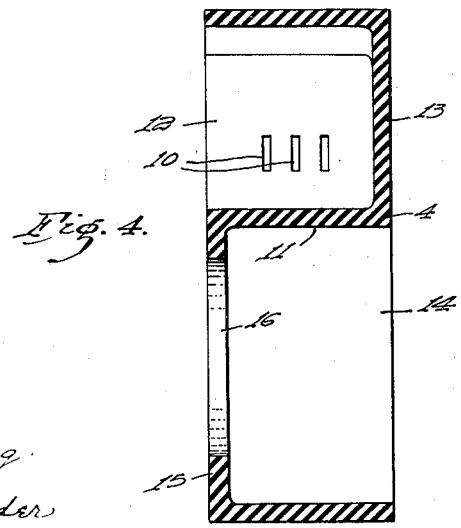

Patented Sept. 16, 1941

2,255,946

UNITED STATES PATENT OFFICE 2,255,946

INSTRUMENT CASING

Uel L. Smith, Morris Plains, N. J., assignor to Westinghouse Electric & Manufacturing Company, East Pittsburgh, Pa., a corporation of Pennsylvania Application December 19, 1939, Serial No. 310,029

2 Claims. (Cl. 171—95)

My invention relates to instrument casings and, more particularly, to an instrument casing for portable electrical measuring instruments.

In prior constructions, it has been usual to place the instrument mechanism in a box-like structure open at one side, with terminals located on a cover for such side and connected to the instrument mechanism when the casing was assembled. There are many disadvantages to this prior art construction. Foremost among these is the difficulty in connecting the terminals in the manner mentioned. It is also necessary to assemble the casing before testing, and the cover must be removed in order to inspect the instrument. In the case of alternating current instruments, the ventilation required for the resistor elements has been difficult to obtain because the entire casing is generally dust-proofed.

According to my invention, I provide a portable instrument with a three-piece casing, so constructed that the instrument mechanism, complete with dial, resistance elements and terminals, is mounted on the central section and the front and rear sections are used only as covers. This permits easier assembly of all parts and allows the instrument to be completely assembled, tested and inspected on the open framework of the central section. The top, front and rear sections are added after all work is done. This construction also makes it possible to dust-proof the instrument mechanism without dust-proofing the entire casing and thus permits the provision of ventilating holes when required.

It is accordingly, an object of my invention to provide a novel and improved casing for measuring instruments.

It is another object of my invention to provide a combination three-piece casing for measuring instruments which facilitates the assembly thereof.

A further object of my invention is to provide an instrument casing of standardized form, different sections of which may be employed to encase instruments of different sizes.

Still another object of my invention is to provide an instrument casing which will make possible adequate ventilation of the mechanism without interfering with proper dust-proofing thereof.

Other objects and purposes of my invention will become evident from the following detailed description, taken in conjunction with the accompanying drawings, in which like reference characters designate like parts.

In the drawings:

Figure 1 is a perspective view of my three-piece casing in assembled condition with an electrical measuring instrument disposed therein;

Fig. 2 is a view in perspective of the two end sections assembled to enclose a smaller instrument;

Fig. 3 is a perspective view from the rear of the center section of the casing of Fig. 1 with the instrument mechanism assembled therein, and Fig. 4 is a sectional view along the line IV—IV of Fig. 3, showing the construction of the central section only.

Referring to Figure 1 of the drawings, a front cover section 1, provided with a glass panel 2, is secured, as by bolts 3, to a central section 4 which carries the entire instrument mechanism. A rear casing section 5 is likewise secured to the central section. Disposed on the outside of the central section 4 are two groups of terminals indicated by 6 and 7 and a carrying strap 9 of the usual construction. Although a group of ventilating slots 10 are shown in the upper portion of the center section 4 it will be obvious that such slots may be provided in the rear section 5 instead, or, if desired, in both sections.

In Fig. 2, the front section 1 and the rear section 5 are secured together by bolts 3 to house a smaller instrument. Since the section 5 has considerable depth, the instrument mechanism may be secured therein in the usual manner with section 1 acting merely as a front cover.

Referring now to Figs. 3 and 4, it will be seen that the central section 4 is provided with a horizontal partition 11, defining an upper compartment 12 closed at the front by a vertical partition 13, and a lower compartment 14. This lower compartment is closed at the rear by a vertical partition 15 which is provided with a circular hole 16 for securing the instrument movement in place.

For purposes of illustration only, a wattmeter has been selected as the instrument to be protected by my casing. Under such circumstances, the terminals 6 will be employed for the current leads and the usual ratio changing terminals 17 and bridging members 18 are provided. The upper terminals 7 will receive the voltage leads. The instrument movement may be of any well known type, and is omitted from the drawings.

A dust-proofing shield 19 is secured to the back of the central section 4, as by bolts 20 (Fig. 3), and supports the instrument movement by means of bolts 21. This instrument movement is partially disposed in the lower compartment 14. A pair of angles 22 are bolted to the rear of the central portion at a point just below the upper compartment 12. Secured to these angles are a pair of insulated posts 23 supporting resistor cards 24, which are electrically connected to the voltage terminals 7 by means of conductors 25. It will be seen that the resistor cards 24 are disposed partly wtihin the compartment 12 and partly to the rear thereof.

As is better shown in Fig. 1, a pointer 26 is positioned to move over the instrument dial 27 which is disposed on the front partition 13 of the central section 4 of the casing.

From the foregoing, it will be evident that the instrument mechanism may be secured to the central portion 4 in a condition readily acceptable for inspection and repair. Likewise the ease with which the mechanism may be assembled in this type of casing will be readily seen. By means of the shield 19, the movement is completely dust-proofed, when the front cover section 1 is in position without interfering with the ventilation of the resistors, which are exposed to the air through the slots 10.

In a case of a direct current instrument where ventilating slots are not required, and in which the movement may be smaller in size, only the front cover section 1 and the rear section 5 need be employed. By means of this combination casing, it will be obvious that standardized parts may be used for instruments of different sizes resulting in manufacturing economy.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination with an electrical instrument including an operating movement, indicating means and resistor means; a three-part casing comprising a central section divided into at least two compartments open at opposite ends of said central section, means for supporting said entire instrument on said central section with said operating movement at least partially disposed in one of said compartments with said indicating means exposed at the open end thereof, and with said resistor means at least partially disposed in the other of said compartments, said supporting means including dust-proofing means to protect said operating movement, a front cover section and means for securing it to the end of said central section at which said indicating means is exposed, a transparent portion in said cover section disposed to permit observation of said indicating means, and a rear cover and means for securing it to the other end of said central section to enclose said resistor and dust-proofing means, at least one of said casing sections being provided with openings for ventilating said resistor means.

2. In combination with an electrical instrument including an operating movement, indicating means and resistor means; a central casing member including a horizontal partition dividing it into a pair of compartments and vertical partitions for closing the front end of the first of said compartments and the rear end of the second compartment respectively, the second of said vertical partitions having an aperture therein, means on said central casing member for supporting said resistor means partly within and partly to the rear of said first compartment, a cup-shaped dust-proofing member and means for securing said operating movement and indicating means to the inside thereof, means for detachably securing said dust-proofing member to said second partition in sealed relationship about the aperture therein to maintain said movement in said second compartment with the indicating means disposed at the open end thereof, a rear cover member for enclosing the rear of said casing member, and a front cover member including a transparent portion adjacent said indicating means for enclosing the front end of said central casing member, the assembly comprising said central casing member and said rear cover member being provided with ventilating means for allowing outside atmosphere to communicate with said resistor means.

UEL L. SMITH.